J. L. WRENN.
ALTERNATING CURRENT PROGRAM SYSTEM.
APPLICATION FILED JAN. 17, 1912.
1,026,290.
Patented May 14, 1912.
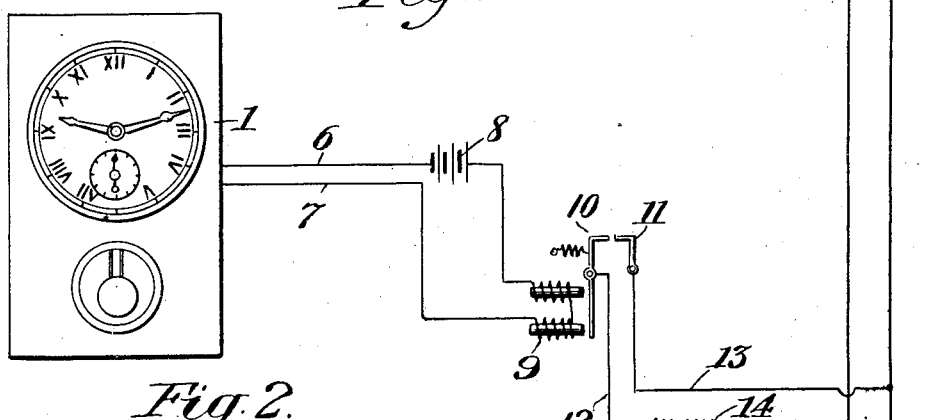
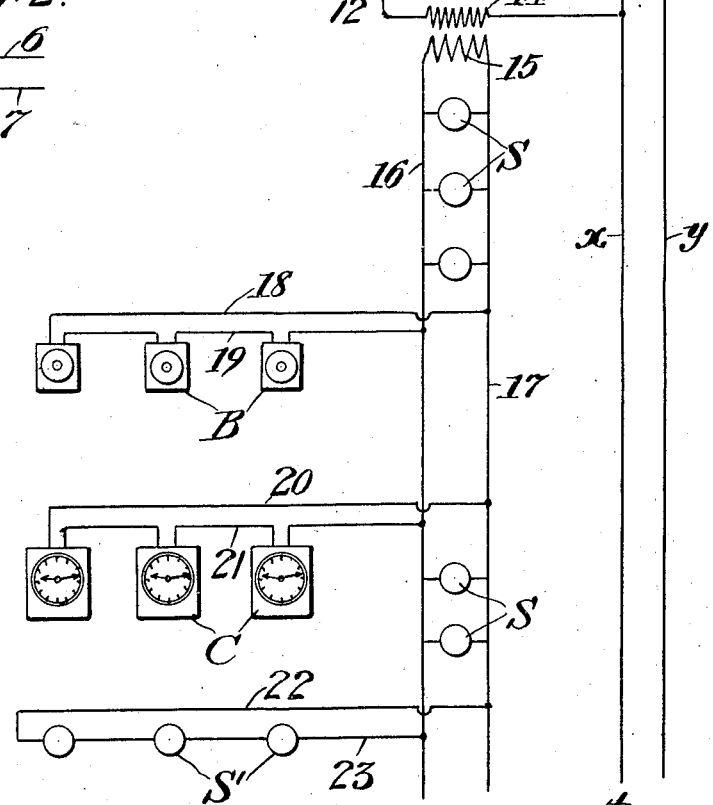

UNITED STATES PATENT OFFICE.

JOHN L. WRENN, OF WASHINGTON, DISTRICT OF COLUMBIA.

ALTERNATING-CURRENT PROGRAM SYSTEM.

1,026,290.      Specification of Letters Patent.      Patented May 14, 1912.

Application filed January 17, 1912. Serial No. 671,698.

*To all whom it may concern:*

Be it known that I, JOHN L. WRENN, a citizen of the United States, residing at Washington, District of Columbia, have invented certain new and useful Improvements in Alternating-Current Program Systems; and I do hereby declare the following to be a full, clear, and exact description of the invention, such as will enable others skilled in the art to which it appertains to make and use the same.

The invention relates to means for operating program systems, involving translating devices such as time stamps, secondary clocks, bells and the like by alternating electric currents, and has for its object to provide a simple and effective apparatus, whereby the translating devices of the character indicated may be actuated at the necessary or desired intervals of time without the interposition of rectifiers between the source of alternating current and the said translating devices.

It has been the general custom heretofore to employ direct current for operating the mechanism of program systems such as electric clocks, time stamps, bells and the like or, in the alternative, where direct current was not available, to take the necessary supply from the alternating current mains and rectify the same by passing it through a rectifier before it was delivered to the translating devices. Owing to the high first cost of these rectifiers and the difficulty and expense of maintaining the same in systems of the character indicated, the employment of alternating current for actuating program systems has met with small favor and success.

The present invention is designed to afford an absolutely simple and reliable system for operating the units of electrical program installations by means of alternating current with the same accuracy and certainty that has heretofore characterized the direct current systems, and to materially reduce the cost of installation, maintenance and operation of the system.

The invention is illustrated in the accompanying drawings in which:

Figure 1 is a diagram of a program system operated by alternating current and controlled from a master-clock; Fig. 2 is a diagrammatic detail of the circuit closing devices, controlled by the master-clock.

The system illustrated in the drawings is intended as one exemplification of the generic invention, which, of course, may be changed or modified to adapt it to various conditions of use.

Referring to the drawings, 1 indicates a master-clock which may be of the usual type, which is adapted to close an electric circuit at regular intervals of time for the purpose of operating the units or translating devices of the program system, such for example as secondary clocks, time stamps, bells and the like. In the form of clock illustrated, there is employed a circuit closer consisting of a delicate spring 5 adapted to be intermittently thrown into contact with a stationary contact member 4 by means of a cam 3 mounted on the arbor of the second hand of the clock, as more particularly illustrated in Fig. 2, so that during a brief interval of the complete revolution of the second hand the contacts 4 and 5 are brought into engagement to close a circuit from a source of current 8 through a relay 9 by way of leads 6 and 7. The said relay 9 controls an armature 10 which is normally retracted from the relay by a suitable spring and disengaged from the stationary contact 11. The armature 10 and the contact 11 constitute a normally open switch in the circuit 12 and 13 of the primary winding 14 of a step-down transformer, the leads 12 and 13 being connected to the mains $x$ and $y$ of an alternating current system, so that when the relay 9 is actuated, the circuit from the mains $x$ and $y$ through the primary winding 14 is closed. Preferably said primary winding is formed with many turns of relatively fine wire. Disposed in proper inductive relation to the primary winding 14 is the secondary winding 15 of the transformer which latter consists of relatively few turns of comparatively heavy wire, so that when the alternating current from the mains $x$ and $y$ of relatively high voltage traverses the circuit of the primary 14 of the transformer it induces in the secondary 15 a current of relatively low voltage and correspondingly high amperage. To illustrate with a concrete example, with current taken from alternating current mains at 110 volts, the primary winding of the step-down transformer has been formed of several hundred turns of 20 gage wire, while the secondary winding 15 has been made of 30 to 40 turns of 16 gage wire.

Connected with the terminals of the secondary winding 15, are the leads 16 and 17 distributed throughout the building, or area where the translating devices or units of the program system are located. The said translating devices in the form of time stamps, secondary clocks, electric bells and the like, are connected to the mains, either in series, in parallel, or series-parallel. In the diagram there are shown a number of time stamps S connected in parallel across the mains 16 and 17 and also a number of time stamps S′ connected in series across the mains by means of leads 22 and 23, and a series of bells B and secondary clocks C likewise connected in series across the mains by means of leads 18 and 19, and 20 and 21 respectively. These translating devices may be of the usual standard construction, involving an electro-magnet responsive to the current to actuate the translating devices in accordance with the established program controlled from the master-clock 1, the only departure from such standard construction consisting in the winding of the magnet actuator. It has been usual to wind the actuating magnets of such translating devices as time stamps, secondary clocks and the like with a relatively large number of turns, but in applying the present invention it is found advantageous to reduce the number of turns on the actuating magnets so that said turns are relatively few in number and are of wire of heavier gage than as ordinarily employed.

The operation of the system, as exemplified in the drawings, is as follows: During a brief portion of each rotation of the second hand arbor 2, the cam 3 causes the light flexible spring 5 to engage the stationary contact 4, thereby closing the circuit from the primary battery 8 through the relay 9, by way of leads 6 and 7. This causes the relay 9 to be energized, thereby attracting the armature 10, the end of which engages stationary contact 11 and closes the circuit from mains x and y, by leads 12 and 13 through the primary 14 of the transformer. The relatively high tension alternating current in the primary 14 induces an alternating current of relatively low tension and high amperage in the secondary 15, which is delivered to the leads 16 and 17 and thence to the windings of the actuating magnets of the time stamps S S′, bells B and clocks C, with the result that the time stamps, the clocks and the bells are each operated but once for each closure of the circuit at the master-clock. It will be noted that the relay circuit and correspondingly the circuit through the primary of the transformer are closed only during a small fraction of each second so that the amount of current used is exceedingly small, costing but a few cents a day for a substantially large system, but nevertheless the relatively small amount of high voltage alternating current flowing in the primary for the brief interval of time is sufficient to induce a low tension current of high amperage required by the actuating magnets of the translating devices.

Where the translating devices are connected in parallel with the leads 16 and 17 of the program system it is frequently found desirable to employ a regulating resistance in connection with the instruments nearer the transformer, so as to deliver the same relative amount of current to each of the instruments of the same character, irrespective of their distance from the transformer. It will also be obvious that, instead of using a primary battery as 8, for the relay circuit, the current for said circuit may be supplied from a small transformer which takes its current from the mains x and y. Likewise, instead of employing a master-clock for controlling the program system any other suitable means may be substituted therefor, including, if desired, hand actuated circuit closing means.

A system installed in strict accordance with that illustrated in the drawings has actually been operated for a long period of time with perfect satisfaction, the time stamps, secondary clocks and bells connected with the leads in the secondary of the step-down transformer have been maintained in practically perfect synchronism with the master-clock and neither the transformer nor the windings of the magnets of the translating devices evidence any tendency to heat. In fact, during the period of operation of the system it has maintained a degree of efficiency and accuracy quite as high as that expected of a similar system employing direct current only and at an operating cost much lower than could be maintained with a direct current system.

What I claim is:

1. An electrically operated program system, comprising a source of alternating current, a working circuit including translating devices to be intermittently actuated, a transformer for delivering relatively low tension current to the working circuit, a relay for closing the circuit from the alternating current source to the transformer, and means for actuating the relay at desired intervals.

2. A program system adapted for operation by alternating electric current, comprising a working circuit including translating devices to be intermittently actuated, a step-down transformer for supplying relatively low tension current to the working circuit, a relay for closing the transformer circuit, and means for closing the relay circuit at desired intervals.

3. A program system adapted for operation by alternating electric current, comprising a working circuit including translating devices to be intermittently actuated, a step-down transformer including a primary winding supplied from an alternating current source and a secondary winding supplying relatively low tension current to the working circuit, a relay for closing the transformer circuit, and a master-clock for intermittently closing the relay circuit.

In testimony whereof I affix my signature, in presence of two witnesses.

JOHN L. WRENN.

Witnesses:
  ARTHUR L. BRYANT,
  CHAS. J. O'NEILL.